United States Patent
Nakatani

Patent Number: 5,254,987
Date of Patent: Oct. 19, 1993

[54] OUTPUT SIGNAL PROCESSING UNIT OF A FLUXGATE SENSOR

[75] Inventor: Yasuhiro Nakatani, Kobe, Japan

[73] Assignee: Fujitsu Ten Limited, Kobe, Japan

[21] Appl. No.: 774,354

[22] Filed: Oct. 10, 1991

[30] Foreign Application Priority Data

Oct. 16, 1990 [JP] Japan .................. 2-275273

[51] Int. Cl.$^5$ ............... G08G 1/123; G01C 17/38
[52] U.S. Cl. .................. 340/988; 324/244; 33/356; 364/571.01; 364/449
[58] Field of Search .............. 340/988; 324/244; 33/355 R, 356; 364/571.01, 571.02, 449

[56] References Cited

U.S. PATENT DOCUMENTS

| | | | |
|---|---|---|---|
| 4,124,897 | 11/1978 | Martin | 340/988 |
| 4,472,716 | 9/1984 | Hansen | 340/988 |
| 4,734,863 | 3/1988 | Honey et al. | 340/988 |
| 4,788,645 | 11/1988 | Zavoli et al. | 340/988 |
| 4,866,627 | 9/1989 | Suyama | 340/988 |

FOREIGN PATENT DOCUMENTS 59-176621 10/1984 Japan.
1-128118 9/1989 Japan.

OTHER PUBLICATIONS

Abstract of J.P. 59-176621, Oct. 6, 1984.

Primary Examiner—Donnie L. Crosland
Attorney, Agent, or Firm—Staas & Halsey

[57] ABSTRACT

An output signal processing unit of a fluxgate sensor including a fluxgate for detecting the magnetic north of a vehicle and a low pass filter for removing a high frequency component from an output of the fluxgate sensor, characterized in that it comprises, a rate sensor detecting an angular velocity of rotation based on the turning of the vehicle, the low pass filter making the cutoff frequency thereof high or low depending on the increase or decrease of the angular velocity of rotation of the rate sensor.

8 Claims, 5 Drawing Sheets

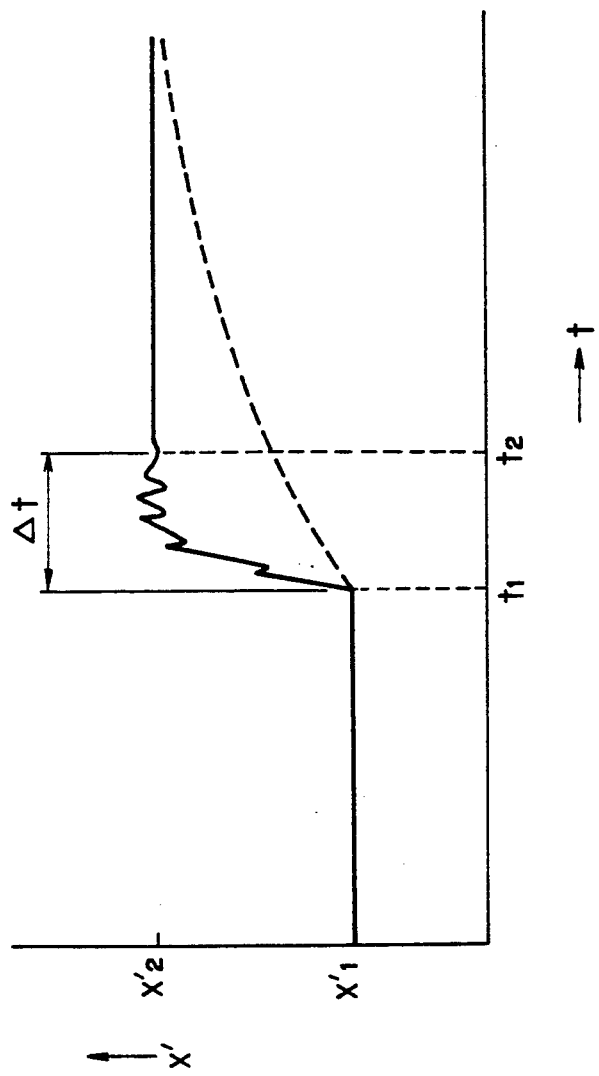

OUTPUT SIGNAL PROCESSING UNIT OF A FLUXGATE SENSOR

BACKGROUND OF THE INVENTION

1. Field of the Invention

The present invention relates to a navigation system of a vehicle providing geographical position information to a driver during driving. More particularly, this invention relates to an improvement of an output signal processing unit of a fluxgate sensor used in the navigation system, which determines a moving direction of the vehicle.

2. Description of the Related Art

Generally, a conventional navigation system of a vehicle includes an output signal processing unit of a fluxgate sensor, which measures an angle of a moving direction relative to magnetic north in order to determine a geometrical position of a vehicle during driving. The output signal processing unit of a fluxgate sensor has a fluxgate sensor that obtains components of terrestrial magnetism both in the X and Y directions, where for example the moving direction is denoted as the X-axis and the direction perpendicular to it is denoted as the Y-axis, and measures momentarily the direction of the vehicle. The geometrical positions of the vehicle XX and YY are obtained from X and Y directions and velocity v of a velocity sensor of the vehicle, which are displayed on a map display, and thereby used in order to provided geographical position information of the vehicle to a driver.

Further, the above output signal processing unit of a fluxgate sensor includes a low pass filter removing a noise signal with a high frequency component due to variations etc. of the magnetic flux caused by a change of magnetic environment generated by driving the vehicle in the periphery of the flux. This low pass filter allows an output signal of the fluxgate sensor to be processed smoothly so that detecting accuracy of terrestrial magnetism is enhanced. Therefore, the above noise signal with a high frequency component does not cause the geographical positions to generate useless variations in the display and prevents the driver from making a mistake.

In the above output signal processing unit of a fluxgate sensor of the prior art, however, when the vehicle turns quickly, a high frequency component appears in the output of the fluxgate sensor, and the above low pass filter causes a time delay because it smoothly processes the high frequency component in the output of the fluxgate sensor. Consequently, a problem arises in that the detecting accuracy of direction in terrestrial magnetism declines, the following performance of the geometrical position becomes poor and the driver can easily make a mistake. Conversely the following performance becomes better when the low pass filter is not used, while the noise signal of the high frequency component can not be removed.

SUMMARY OF THE INVENTION

An object of the present invention is to solve the above problem by providing an output signal processing unit of a fluxgate sensor, which performs better when a vehicle turns quickly.

FIG. 1 is a view showing a principle of an embodiment of the present invention. With this object in mind, the essence of the invention resides in an output signal processing unit of a fluxgate sensor comprising a low pass filter 2 for smoothing an output of the fluxgate sensor, wherein cutoff frequency of the low pass filters becomes higher or lower depending on the increase or the decrease of the angular velocity of rotation in turning the vehicle.

With the output signal processing unit of a fluxgate sensor, when the vehicle is going straight ahead, the angular velocity of rotation $\omega$ of the rate sensor 3 is zero so that the cutoff frequency of the low pass filter is smoothed to remove the high frequency noise. When the vehicle turns, the cutoff frequency of the low pass filter 2 becomes high depending on the increase of the angular velocity of rotation of the rate sensor 3, so that the frequency component of the output of the fluxgate sensor 1 is not smoothed, which improves the following performance without a time lag. Then, the high frequency component noise also passes through the low pass filter 2, but is smaller than the output signal of the fluxgate sensor 1 and the passing time of the noise is very short, preventing a driver from making a mistake.

BRIEF DESCRIPTION OF THE DRAWINGS

The invention will be further described with reference to embodiments thereof, and to the accompanying drawings. Note, in the drawings, like parts are designated throughout by the same reference characters.

FIG. 5 is a view showing a wave shape of an output signal in the low pass filter according to the embodiment of the present invention.

DESCRIPTION OF THE PREFERRED EMBODIMENTS

The preferred embodiment of an output signal processing unit of a fluxgate sensor according to the present invention will be discussed with reference to the accompanying drawings.

Figure 1:
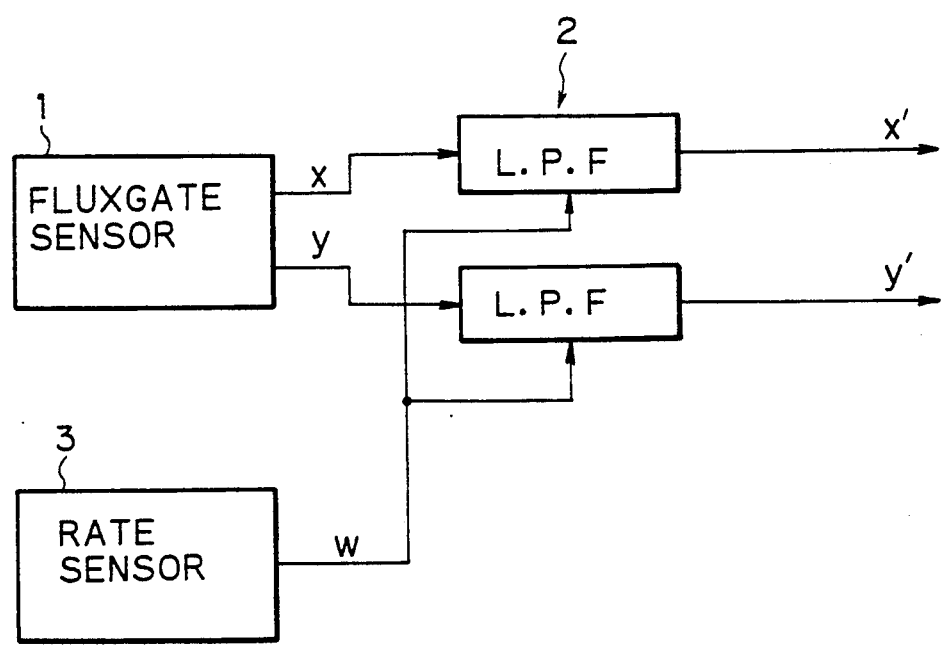
FIG. 1 is a view showing a principle of the embodiment of the present invention.
Figure 2:
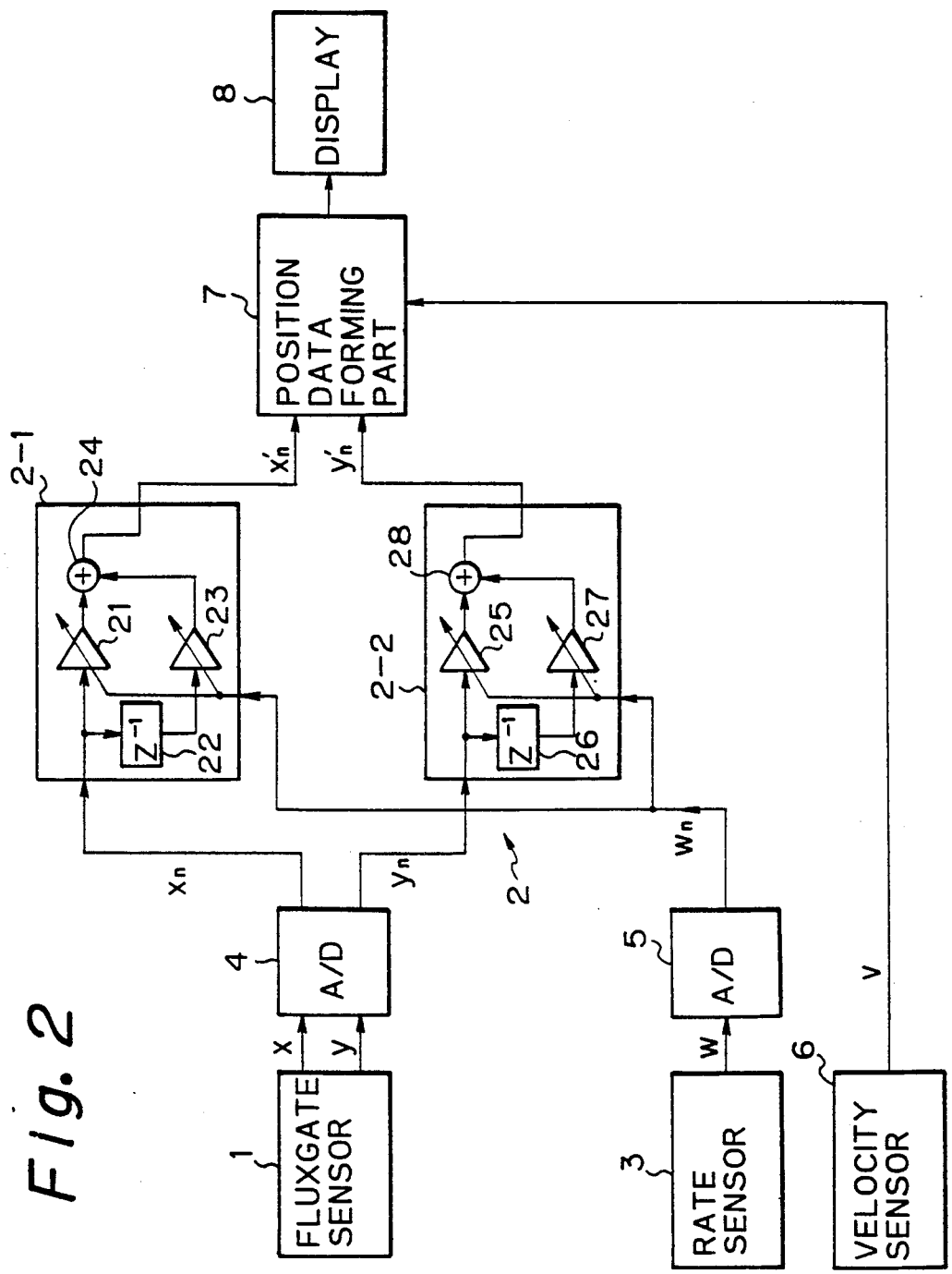
FIG. 2 is a view showing an output signal processing unit of a fluxgate sensor according to the embodiment of the present invention.

FIG. 2 is a view showing the output signal unit of the fluxgate sensor according to the embodiment of the present invention. The overall construction of the preferred embodiment of the output signal processing unit of a fluxgate sensor will be discussed with reference to FIG. 2. The output signal processing unit of a fluxgate sensor includes: a fluxgate sensor 1, which detects components of terrestrial magnetism both in the X and Y directions where for example the moving direction is denoted as the X-axis and the direction perpendicular to it is denoted as the Y-axis, and measures momentarily the directions of the vehicle; a low pass filter 2 for removing a high frequency component of the output of the fluxgate sensor; a rate sensor 3 (i.e., an angular velocity sensor) of, for example, a piezo-electric oscillating gyro-sensor that detects an angular velocity $\omega$ of rotation of the vehicle while turning and causes a cut off frequency of the low pass filter 2 to increase or decrease corresponding to the increase or decrease of the angular velocity $\omega$ of the rotation respectively; an A / D ( Analog to Digital) converter 4 for converting analog signals x, y of the fluxgate sensor 1 into digital signals $x_n$, $y_n$;

an A/D converter 5 of the rate sensor 3 for converting an analog signal ω into a digital signal $ω_n$, a velocity sensor 6 which detects a velocity signal v of the velocity; a position data forming part 7, which forms geometrical position data xx and yy of the vehicle from the output signals $x_n'$ and $y_n'$ of the fluxgate sensor 1 in which the high frequency components are removed by the low pass filter and from the velocity signal v of the velocity sensor 6; a display 8 for displaying the geometrical position data xx and yy processed by the position data forming part 7 in a map drawn up beforehand.

Discussion will be given herebelow for the low pass filter 2. As shown in FIG. 2, the filter 2 includes two low pass filters 2-1 and 2-2 corresponding to the digital signals $x_n$ $y_n$ respectively from the fluxgate sensor 1. The low pass filter 2-1 includes a variable multiplier 21 that inputs the $X_n$ component signal from the A/D converter 4, a delay element 22 for delaying the $x_n$ component signal by one sampling period, a variable multiplier 23 that inputs a delay signal from the delay element 22, and an adder 24 for adding the outputs of the variable multipliers, 21 and 23 respectively to output the added signal $X'_n$ the position data forming part 7. The explanation of the low pass filter 2-2 is omitted, but is the same as that of the above low pass filter 2-1.

Next, an operation of the output signal processing unit of a fluxgate sensor will be discussed herebelow. The vehicle is provided with an X coordinate along the moving direction of the vehicle and a Y coordinate perpendicular thereto. The vehicle is also provided with the fluxgate sensor so as to be able to measure magnetic flux density $B_x$ in the X direction and magnetic flux density $B_y$ in the Y direction. Expressing the magnetic flux density of terrestrial magnetism as B, the fluxgate sensor 1 generates an electrical signal X proportional to the magnetic flux density $B_X$ as an x directional component and an electrical signal y proportional to the magnetic flux density $B_Y$ as a Y directional component. The analog signals x and y from the fluxgate sensor 1 are converted into the digital signals $X_n$ and $y_n$) respectively. In the low pass filters 2-1 and 2-2, the factors of the multipliers 21 and 25 are set to $α = P_n/P_m)_n$ respectively and the factors of the multipliers 23 and 27 are set to $β = (P_{min} - P_n)/P_{min}$. Since the inputs of the low pass filters 2-1 and 2-2 are $x_n$ and $y_n$, their outputs $x_n'$ and $y_n'$ are $$x_n' = α \cdot x_n + β \cdot x_{n-1}$$
$$= \{x_n \cdot P_n + x_{n-1} \cdot (P_{min} - P_n)\}/P_{min} \text{ and}$$
$$y_n' = α \cdot y_n + β \cdot y_{n-1}$$
$$= \{y_n \cdot P_n + y_{n-1} \cdot (P_{min} - P_n)\}/P_{min},$$

where $P_n = \min(P_{min}, k \cdot ω_n)$, $ω_n$ is an angular velocity of rotation of the rate sensor 3, and k takes a constant value.

Figure 3:
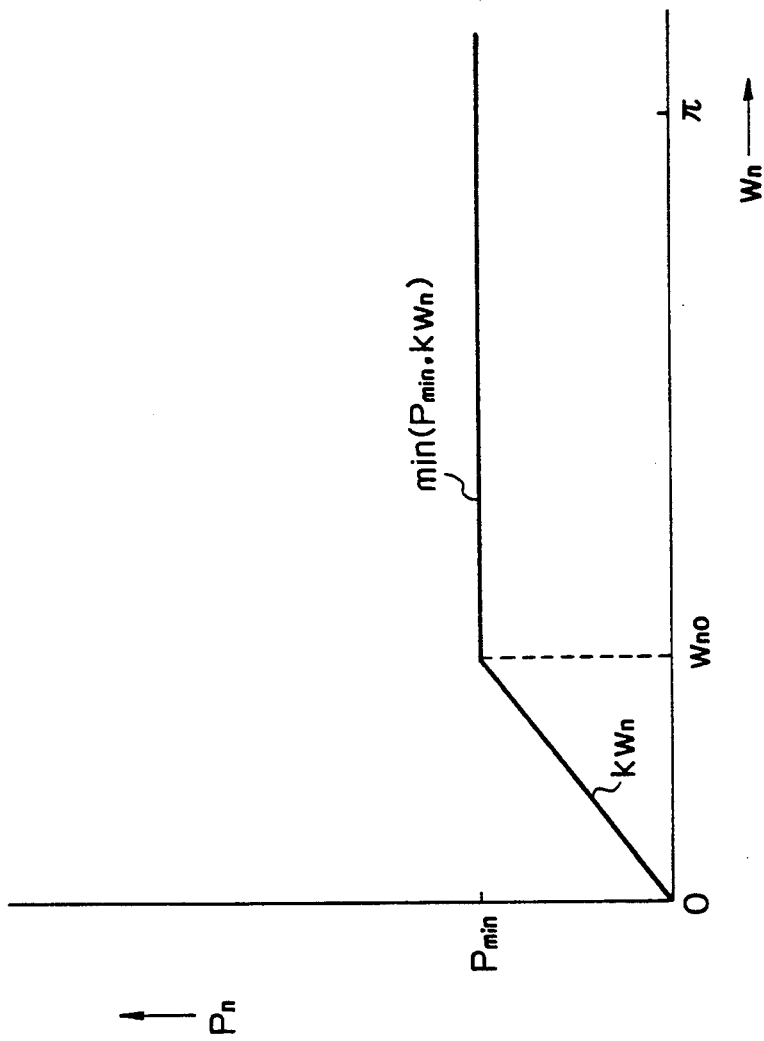
FIG. 3 is a view showing characteristics of $P_n$ determining a multiplying facter.

FIG. 3 is a view showing characteristics of P determining a multiplying factor. As shown in the Figure, when the vehicle is not turning, the angular velocity $ω_n$ of rotation is in a range of $ω_n = 0$ to a given value of $ω_n$ $_O$.

Further in the case of $0 ≤ ω_n ≤ ω_n$ $_O$, $P_n = P_{min} = k \cdot ω_n$ $_O$, and in the case of $ω_n ≥ ω_n$ $_O$, $P_n = k \cdot ω_n$. In such a way the present invention allows the multiplication factors of the multipliers 21, 25 and 23, 27 to be variable depending on the output $ω_n$ of the rate sensor 3.

Generally an amplitude $|A(ω_n \cdot T)|$ of $X_n'$ and $|A(ω_n \cdot T)| =$ $$|A(ω_n \cdot T)| = \sqrt{α^2 + β^2 + 2αβ\cos ω_n T}$$

Figure 4:
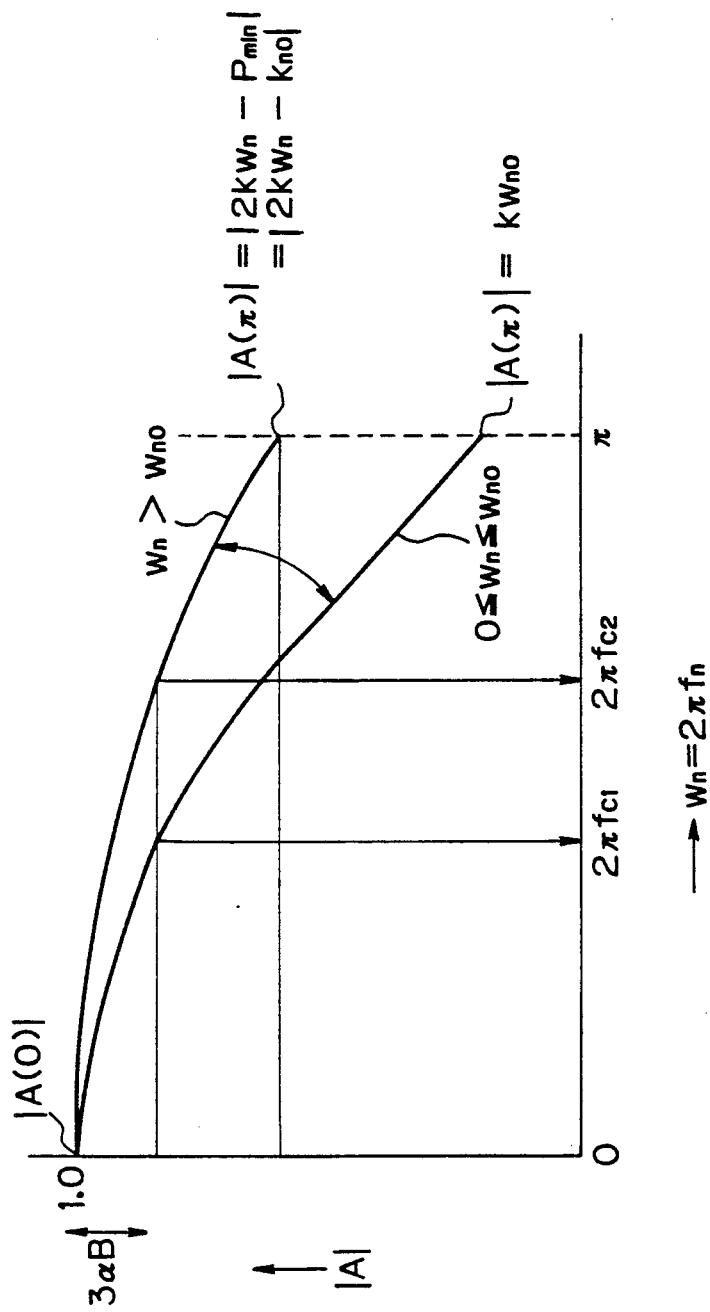
FIG. 4 is a view showing amplitude characteristics of a low pass filter of FIG. 2.

FIG. 4 is a view showing amplitude characteristics of a low pass filter of FIG. 2. The horizontal axis shown in the Figure indicates the angular velocity of rotation $ω_n = 2πf_n$ and the vertical axis indicates the amplitude $|A(ω_n T)|$ where $f_n$ denotes frequency. When $ω_n \cdot T = 0$, $|A(0)| = |α + β| = 1.0$ for any of α and β. On the other hand when $ω_n \cdot T = π$, $|A(π)| = |α - β| = |2P_n - P_{min}| = |2k \cdot ω_n - P_{min}| = |2k \cdot ω_n - k \cdot ω_n$ $_O|$. When α and β change depending on $ω_n$, the curve shown in the FIG. 4 moves upward and downward. Further when $0 ≤ ω_n ≤ ω_n$ $_O$, $|A(π)| = |2k ω_n - P_{min}| = k \cdot ω_n$ $_O$. In the present invention the angular velocity of rotation $ω_n$ is given by the rate sensor 3 so that α and β of the low pass filter are controlled. As shown in the Figure, when $0 ≤ ω_n ≤ ω_n$ $_O$, $|A(0)|$ becomes smaller by 3 dB at a cutoff frequency $f_{c1}$. If a cutoff frequency is $f_{c2}$ when $ω_n > ω_n$ $_O$ an inequality of $f_{c2} > f_{c1}$ holds. That is to say, when the vehicle does not turn, the cutoff frequency in the low pass filter 2 becomes $f_{c1}$ but changes from $f_{c1}$ to $f_{c2}$ and increases with the turning of the vehicle. After turning, the cutoff frequency changes from $f_{cZ}$ to $f_{c1}$ and decreases. In such a way, the cutoff frequency of the low pass filter 2 is controlled with the angular velocity of rotation $ω_n$ by means of the rate sensor 3.

FIG. 5 is a view showing a wave shape of an output signal in the low pass filter according to the embodiment. In a wave shape shown in the Figure, letting a digital signal $x'$. denote an analog signal $x_n$, the vehicle is going straight ahead or turns to a small degree to the time $t_1$ so that the angular velocity of rotation ω of the rate sensor 3 exists in $0 ≤ ω_n ≤ ω_n$ $_O$ where the cutoff frequency of the low pass filter 2-1 is little more than $f_{c1}$. Thereby, a high frequency noise is removed to make the output signal $x'$ smooth. When the vehicle turns from the time $t_1$ to the time $t_2$, the output signal $x'$ changes from $x'_1$ to $x'_2$ and the angular velocity in rotation $ω_n$ of the rate sensor 2-1 becomes $ω_n > ω_n$ $_O$. Therefore the cutoff frequency of the low pass filter 2-1 changes from $f_{c1}$ to $f_{c2}$ to make a leading edge sharp as shown in the Figure. After the time $t_2$ the angular velocity of rotation $ω_n$ of the rate sensor 3 is zero, the cutoff frequency changes from $f_{c2}$ to $f_{c1}$ to remove the high frequency component so that the output signal $x'$ is smoothed. A dotted line shown in the Figure indicates a changing state of the output signal $x'$ in which the multiplying factors of the prior art low pass filter is kept to $f_{c1}$. Therefore the low pass filter according to the present invention removes the high frequency noise while going straight ahead and also improves the following performance for turning of the vehicle compared with the prior art. Before the turning of the vehicle finishes, higher mode frequency components are superimposed for a short time but the change of the output $x'$ itself is so great that a driver is hardly influenced. Similarly, the output signal $y'$ may be explained.

Next another embodiment of a multiplying factor of a multiplier in the low pass filters 2-1 and 2-2 will be discussed. In the embodiment, the multiplying factors of the multipliers 21 and 25, and 23 and 27 of FIG. 2 are set to $$\alpha = (P_n + \delta)/P_{min}, \quad \beta = (P_{min} - P_n - \delta)/P_{min},$$

where $P_n = \min(P_{min} - \delta, k \cdot \omega_n)$, $\delta =$ a given value
This is provided to prevent data from holding a constant value since $x_n = x_{n-1}$ and $y_n = y_{n-1}$ in said embodiment when $\omega_n = 0$ (going straight ahead).

Thus letting an angle between the magnetic north and the moving direction of the vehicle be $\theta$, $x'_n$ and $y'_n$ processed by the low pass filters 2-1 and 2-2 are processed by the position data forming part 7 so as to be $$\cos\theta = x_n'/\sqrt{(x_n')^2 + (y_n')^2}$$

$$\sin\theta = y_n'/\sqrt{(x_n')^2 + (y_n')^2}.$$

In order to obtain the geometrical position xx and yy of the vehicle, this result and the velocity of the vehicle V are processed as $$xx = \int V \cdot \cos\theta \, dt$$

$$yy = \int V \cdot \sin\theta \, dt.$$

This geometrical position xx and yy is displayed as a moving position of the vehicle in the map of the display 8 to be improved regarding the following performance in the turning of the vehicle according to the invention.

As mentioned before, according to the invention, the cutoff frequency of the low pass filter is increased or decreased depending on the increase or decrease of the angular velocity of rotation from the rate sensor so that it is possible to remove the high frequency component of the fluxgate sensor while going straight ahead and improve the following performance during turning.

I claim:

1. An output signal processing unit for a fluxgate sensor system comprising:
    a fluxgate sensor which detects magnetic north and produces, as an output, a fluxgate sensor signal representative of the detected magnetic north;
    an angular velocity sensor which is responsive to movement thereof in a direction angularly displaced from a straight line path of movement and which produces, as an output thereof, an angular velocity signal having a variable value indicative of the magnitude of the angular velocity of rotation of the angularly displaced movement relative to the straight path of movement; and
    a low pass filter having a variable cutoff frequency and coupled to the fluxgate sensor and the angular velocity sensor for receiving the respective output signals thereof, the low pass filter responding to the variable value of the received angular velocity signal for correspondingly varying the variable cutoff frequency thereof in accordance with increasing and decreasing same in response to respective increases and decreases, respectively, of the angular velocity of rotation as represented by the angular velocity signal, and filtering the received fluxgate sensor signal in accordance with the varied cutoff frequency.

2. The output signal processing unit as claimed in claim 1, wherein the angular velocity sensor comprises a piezoelectric oscillating gyro-sensor.

3. An output signal processing unit for a fluxgate sensor system for use in a vehicle comprising:
    a fluxgate sensor fixedly mounted in the vehicle movement therewith which detects magnetic north and produces, as an output, a fluxgate sensor signal representative of the detected magnetic north;
    an angular velocity sensor fixedly mounted in the vehicle for common movement therewith and which is responsive to common movement in a direction angularly displaced from a straight line path of common movement and which produces, as an output thereof, an angular velocity signal having a variable value indicative of the magnitude of the angular velocity of rotation of the angularly displaced common movement relative to the straight path of common movement; and
    a low pass filter having a variable cutoff frequency and coupled to the fluxgate sensor and the angular velocity sensor for receiving the respective output signals thereof, the low pass filter responding to the variable value of the received angular velocity signal for correspondingly varying the variable cutoff frequency thereof in accordance with increasing the decreasing same in response to respective increases and decreases, respectively, of the angular velocity of rotation as represented by the angular velocity signal, and filtering the received fluxgate sensor signal in accordance with the varied cutoff frequency.

4. The output signal processing unit as claimed in claim 3, wherein the angular velocity sensor comprises a piezoelectric oscillating gyro-sensor.

5. The output signal processing unit as claimed in claim 3 further comprising:
    a velocity sensor sensing velocity of the vehicle and producing a velocity signal; and
    position data forming means for receiving the filtered fluxgate sensor signal form the low pass filter and the velocity signal form the velocity sensor, and for forming a geometrical position of the vehicle form the filtered fluxgate signal and the velocity signal.

6. The output signal processing unit as claimed in claim 5 further comprising:
    display means for receiving a signal from position data forming means and displaying the geometrical position formed by the position data forming means on a map.

7. An output signal processing unit comprising:
    a fluxgate sensor which detects first and second components of magnetic north and produces first and second analog signals, based on the detected first and second components respectively, wherein the first component is denoted as the moving direction of a vehicle and the second component is denoted as the direction perpendicular to the moving direction;
    a first A/D converter, coupled to the fluxgate sensor, receiving first and second analog signals form the fluxgate sensor and converting the first and second analog signals to first and second digital signals respectively;
    an angular velocity senor which is responsive to movement thereof in a direction angularly displaced from a straight line path of movement of a vehicle and which produces, as an output thereof, an analog angular velocity signal having a variable analog value indicative of the magnitude of the angular velocity of rotation of the angularly displaced movement relative to the straight path of movement of the vehicle;

a second A/D converter coupled to the angular velocity sensor, receiving the analog angular velocity signal and converting the analog angular velocity signal to a digital angular velocity signal;

a first low pass filter having a variable cutoff frequency and coupled to the first A/D converter and the second A/D converter for receiving the first digital signal and the digital angular velocity signal respectively, the first low pass filter responding to the received digital angular velocity signal for correspondingly varying the variable cutoff frequency thereof in accordance with increasing and decreasing same in response to respective increases and decreases, respectively, of the angular velocity of rotation as represented by the digital angular velocity signal, and filtering the received first digital signal in accordance with the varied cutoff frequency;

a second low pass filter having a variable cutoff frequency and coupled to the first A/D converter and the second A/D converter for receiving the second digital signal and the digital angular velocity signal respectively, the second low pass filter responding to the received digital angular velocity signal for correspondingly varying the variable cutoff frequency thereof in accordance with increasing and decreasing same in response to respective increases and decreases, respectively, of the angular velocity of rotation as represented by the digital angular velocity signal, and filtering the received second digital signal in accordance with the varied cutoff frequency;

a velocity sensor sensing velocity of the vehicle and producing a velocity signal; and position data forming means for receiving the first filtered digital signal, the second filtered digital signal and the velocity signal and for producing the position data of the vehicle, based on the first filtered digital signal, the second filtered digital signal and the velocity signal.

8. The output signal processing unit as claimed in claim 7 further comprising means for displaying the geometric position data produced by the position data forming means on a map.

* * * * *

UNITED STATES PATENT AND TRADEMARK OFFICE
CERTIFICATE OF CORRECTION

PATENT NO. : 5,254,987
DATED : October 19, 1993
INVENTOR(S) : Yasuhiro NAKATANI

It is certified that error appears in the above-indentified patent and that said Letters Patent is hereby corrected as shown below:

Col. 1, line 27, change "XX" to --xx-- and "YY" to --yy--.
Col. 2, line 2, change "filters" to --filter 2--.
Col. 3, line 15, change "$x_n\ y_n$" to $X_n$, $Y_n$--.
Col. 3, line 22, delete ",".
Col. 3, line 23, after "$X'_n$" insert --to--.
Col. 3, line 23, change "$X'_n$" to --$x'_n$--.
Col. 3, line 29, after "vehicle" insert --,--.
Col. 3, line 35, change "X" to --x--.
Col. 3, line 36, change "x" to --X--.
Col. 3, line 40, change "$Y_n$)" to --$Y_n$,--.
Col. 3, line 40, change "$X_n$" to --$x_n$--.
Col. 3, line 43, change "$a = P_n/P_m)_n$" to --$a = P_n/P_{min}$--.
Col. 3, line 59, change "P" to --$P_n$--.
Col. 4, line 2, delete "$|A(\omega_n.T| = $".
Col. 4, line 21, after "$0 \leq$" insert --$\omega$--.
Col. 4, line 23, after "0" insert --,--.
Col. 4, line 28, change "z" to --2--.
Col. 4, line 35, change "x'." to --$X'_n$--.
Col. 4, line 37, "$\omega$" should be --$\omega_n$--.
Col. 4, line 50, change "$f_{c2}2$" to --$f_{c2}$--.
Col. 5, line 4, after "value" insert --.--.
Col. 5, line 6, change "$X_n$-$X_{n-1}$" to --$X_n = N_{n-1}$--
change "$Y_n$-$Y_{n-1}$" to --$Y_n = Y_{n-1}$--.
Col. 6, line 38, change "form" to --from--.
Col. 6, line 39, change "form" to --from--.
Col. 6, line 40, change "form" to --from--.

UNITED STATES PATENT AND TRADEMARK OFFICE
CERTIFICATE OF CORRECTION

PATENT NO. : 5,254,987
DATED     : October 19, 1993
INVENTOR(S) : Yasuhiro Nakatani It is certified that error appears in the above-indentified patent and that said Letters Patent is hereby corrected as shown below:

Col. 6, line 58, change "form" to --from--.

Signed and Sealed this

Ninth Day of August, 1994

*Attest:*

BRUCE LEHMAN

*Attesting Officer*   *Commissioner of Patents and Trademarks*